US008188293B2

(12) United States Patent
Tournilhac et al.

(10) Patent No.: US 8,188,293 B2
(45) Date of Patent: May 29, 2012

(54) ELASTIC MATERIALS

(75) Inventors: Francois-Genes Tournilhac, Paris (FR); Ludwik Leibler, Paris (FR); Philippe Cordier, Buros (FR); Corinne Soulie-Ziakovic, Paris (FR)

(73) Assignees: Arkema France, Colombes (FR); C.N.R.S., Paris (FR)

( * ) Notice: Subject to any disclaimer, the term of this patent is extended or adjusted under 35 U.S.C. 154(b) by 595 days.

(21) Appl. No.: 11/815,982

(22) PCT Filed: Feb. 14, 2006

(86) PCT No.: PCT/FR2006/000355
§ 371 (c)(1),
(2), (4) Date: Sep. 22, 2008

(87) PCT Pub. No.: WO2006/087475
PCT Pub. Date: Aug. 24, 2006

(65) Prior Publication Data
US 2009/0062551 A1  Mar. 5, 2009

Related U.S. Application Data

(60) Provisional application No. 60/663,988, filed on Mar. 22, 2005.

(30) Foreign Application Priority Data

Feb. 15, 2005  (FR) ...................................... 05 01528

(51) Int. Cl.
C07D 403/12  (2006.01)
(52) U.S. Cl. .................................................... 548/313.7
(58) Field of Classification Search ................. 548/313.7
See application file for complete search history.

(56) References Cited

U.S. PATENT DOCUMENTS

| 6,307,058 B1 | 10/2001 | Singh et al. |
| 6,320,018 B1 | 11/2001 | Sijbesma et al. |
| 6,803,447 B2 | 10/2004 | Janssen et al. |
| 7,250,487 B2 * | 7/2007 | Tournilhac et al. ........... 528/422 |
| 2005/0148760 A1 | 7/2005 | Tournilhac et al. |
| 2006/0018856 A1 | 1/2006 | Bosman et al. |

FOREIGN PATENT DOCUMENTS

| WO | WO01/07396 | 2/2001 |
| WO | WO 03/059964 | * 6/2003 |

OTHER PUBLICATIONS

Brunsveld, L, et al "Supramolecular polymers" Chemical Review, American Chemical Society, Easton, US, vol. 101, Dec. 2001, pp. 4071-4097. Lange, R.F., et al: "Hydrogen-Bonded Supramolecular Polymer Networks", Journal of Polymer Science, PolymeiChemistry Edition, Interscience publishers, New York, NY, US, vol. 37, 1999, pp. 3657-3670.
Folmer, B.J.B. et al; "Supramolecular Polymer Materials: ChainExtension of Telechelic Polymers using a Reactive Hydrogen-Bonding Synthon", Advanced Materials, VCH Verlagsgesellschaft, Weinheim, DE, vol. 12, No. 12, Jun. 16, 2000, pp. 874-878.

* cited by examiner

*Primary Examiner* — Andrew D Kosar
*Assistant Examiner* — Valerie Rodriguez-Garcia
(74) *Attorney, Agent, or Firm* — Thomas F. Roland

(57) ABSTRACT

The present invention relates to materials exhibiting the property of rubbery elasticity, consisting of molecules with a mass of between 9 and 9000 g/mol, all or some of the molecules having at least three groups (also referred to as "associative groups") capable of associating via non-covalent interactions.
Although consisting of small non-polymerized molecules that are not chemically crosslinked, this material exhibits properties of rubbery elasticity. According to an embodiment of the invention, this material exhibits rubbery elasticity at ambient temperature. Above a certain temperature, the material flows like a simple liquid. The material is thermoreversible, i.e. after cooling, the material again exhibits the property of rubbery elasticity. This material is self-repairing and potentially recyclable, which is never the case with a chemically crosslinked elastomer.

Figure 1:
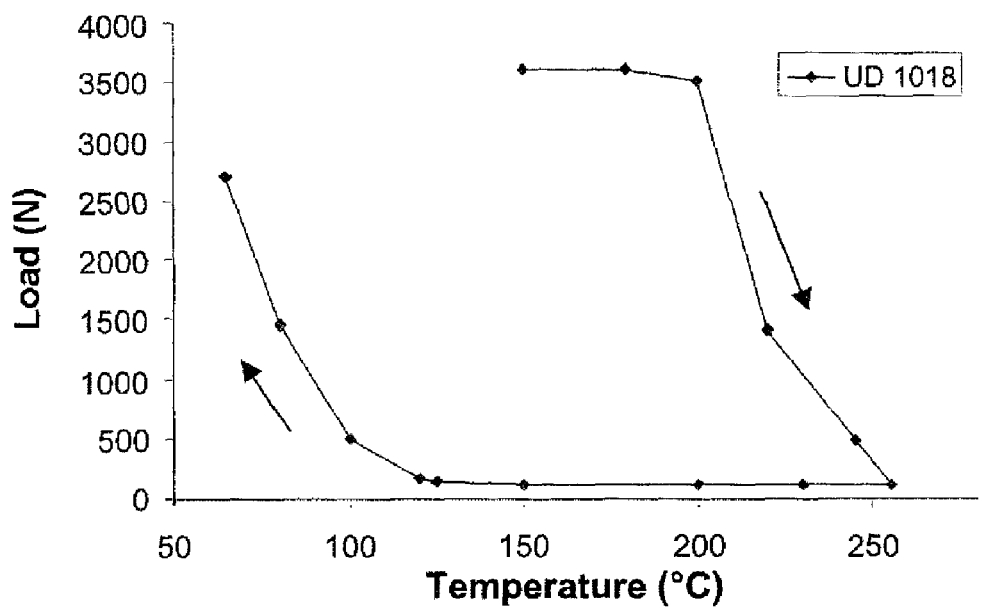

According to an embodiment of the invention, the molecules constituting the material of the invention bear associative groups of formula (1) below:

(1)

in which A denotes oxygen, sulphur or NH; the carbon atoms of formula (1) can be substituted. Preferably, A denotes oxygen. Advantageously, the material comprises (i) molecules having at least 3 associative groups, and (ii) molecules having a single associative group.

Advantageously, the molecules are obtained from fatty acid derivatives.

17 Claims, 10 Drawing Sheets

ELASTIC MATERIALS

This application claims benefit, under U.S.C. §119 or §365 of French Application Number FR 05.01528, filed Feb. 15, 2005; PCT/FR2006/000355 filed Feb. 14, 2006, and U.S. 60/663,988, filed Mar. 22, 2005.

FIELD OF THE INVENTION

The present invention relates to elastic materials exhibiting the property of rubbery elasticity. More precisely, these materials consist of molecules linked via non-covalent or physical bonds, for example hydrogen bonds. These materials have properties that can recall those of a rubber. Unlike conventional elastomers, the materials according to the invention can become fluid above a certain temperature, which is an advantage in steps using and recycling these materials. By definition, an elastomer should both have a dimensional stability over very long periods of time after very substantial distortions (elongation of 100 to 600%), of recovering its initial shape. The property of rubbery elasticity is also assessed by means of the compression set after relaxation of the stress having caused the distortion. These materials are used for manufacturing leaktight joints, thermal insulating materials, sound-proofing materials, tyres, cables, sheaths, soles of shoes, packagings, coatings (paints, cosmetic products, films), elastic clamping collars, vacuum tubes, transport tubes and flexible hoses, rheological additives (for example: cosmetic), fluids, or as additives in adhesives and in hot-melt adhesives.

PRIOR ART AND TECHNICAL PROBLEM

The term "rubbery elasticity" is intended to mean the material undergoing a uniaxial distortion of 20% for a period of 15 minutes at the temperature of use returns to its initial size with a compression set of less than 5% of the initial size, i.e. the material of initial length $L_0$ before distortion, has been distorted under a uniaxial stress to a length $L_d$ for 15 minutes, always at the temperature of use, such that $(L_d-L_0)/L_0$ is greater than or equal to 0.2 and returns to a length $L_f$ which is the final length of the material after relaxation of the stress, such that $(L_f-L_0)/L_0$ is less than 0.05, advantageously $(L_d-L_0)/L_0$ is greater than or equal to 0.8, preferably $(L_d-L_0)/L_0$ is greater than or equal to 1. The rubbery elasticity is in principle a characteristic property of polymer systems. Conventionally, it manifests itself neither in inorganic materials (glasses, metals, oxides, ionic solids, etc.) nor in molecular materials, whether they are crystalline or amorphous. Conventional elastomers such as SBR (Styrene Butadiene Rubber) or NBR (Nitrile Butadiene Rubber) are polymers that result from the linking of molecules (monomers) attached to one another via covalent bonds. These polymers may also be crosslinked. Objects consisting of these elastomers have a definitive shape, unlike objects consisting of thermoplastic polymer. Thus, objects made of polyamide 6 (a thermoplastic polymer) are produced by moulding or injection of the PA 6, which is liquid above 210° C., and then the object is obtained by cooling. The object can be heated and, above 210° C., it becomes liquid PA 6, and this liquid PA 6 can again be moulded or injected and so on.

Thermoplastic elastomers also exist, for example polyether block amides or EPRs (abbreviation of Ethylene Propylene Rubber). These polymers transform in the same way as PA 6 (they are liquid above a certain temperature and solid below it), and the objects obtained have elastomeric properties, but they do not have a definitive shape like objects consisting of crosslinked elastomers.

However, crosslinked or non-crosslinked elastomers, thermoplastic elastomers and thermoplastic polymers all result from the linking of molecules (monomers) attached to one another via covalent bonds, which are called macromolecules; these macromolecules have molecular masses of at least 10000 g/mol.

A material has now been found that has elastic properties and that consists of molecules linked via non-covalent bonds, for example hydrogen bonds. Unlike conventional elastomers, this one can become fluid above a certain temperature, which is an advantage in steps using and recycling these materials. The word "molecules" used in the description of this invention is here intended to oppose the word "macromolecules"; it therefore involves compounds whose molecular mass is less than 9000 g/mol, and typically of the order of 500 to 1500 g/mol.

The prior art has already described supramolecular polymers. Thus, patent application WO 03 059964 describes a supramolecular polymer comprising units linked via hydrogen bonds, these units being monomers or prepolymers comprising at least one function chosen from functions (1) and (3) and a second function chosen from functions (1) to (5), below:

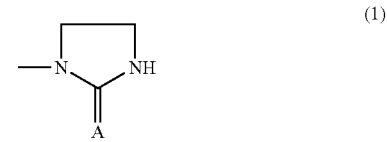

(1)

(2)

(3)

(4)

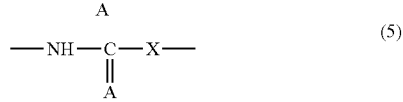

(5)

in which A denotes oxygen, sulphur or NH, and X denotes any unit; the hydrogen bonds in the supramolecular polymer occurring between two functions, that may be identical or different, chosen from functions (1) to (5).

The polymers of the invention can be used alone, i.e. in the form of a composition consisting essentially of these polymers and, optionally, of stabilizers, or antioxidants, etc., or in the form of a mixture with other polymers or other products. In this prior art, elastomers are neither described nor suggested. In Example 5 of this prior art, the starting product is Crayamid 115®, which is a polyamidoamine ($\overline{Mw}$~2000-4000 g/mol), produced from condensation of a dimer of acid of the TOFA type (Anglo-Swedish abbreviation of Tall Oil Fatty Acid, or fatty acid got from pine) and of triethylenetetramine, TETA. Subsequently, by reaction with urea, a product having two imidazolidone functions is obtained. As specified in patent application WO 03/059964, the presence of acid trimer in trace amounts in the acid dimer used can lead to the formation of molecules containing three imidazolidone groups. However, by virtue of the small amount of trimers effectively present in the acid dimers used and due to the presence of impurities in the TETA used (of which commercial grades typically have a purity of 60%), the reaction of polyamidoamines, such as Crayamid 115, with urea does not make it possible to generate a large number of molecules which have three imidazolidone groups. The molecules described in this document do not make it possible to have a material exhibiting rubbery elasticity.

A subject of the invention is a material comprising at least one molecule with a molecular mass ranging from 9 to 9000 g/mol, said molecule comprising at least three associative functional groups, each associative functional group comprising at least one function capable of forming a physical bond, said material having a rubbery elasticity measured at the temperature of use, said rubbery elasticity being defined by the fact that, after a distortion under uniaxial stress for 15 minutes of said material from an initial length $L_0$ to a length $L_d$ such that $(L_d-L_0)/L_0$ is greater than or equal to 0.2, the material returns, after relaxation of the uniaxial stress, to a length $L_f$ such that $(L_f-L_0)/L_0$ is less than or equal to 0.05, given that $L_0$ is the initial length of the material, $L_d$ is the length of the distorted material under uniaxial stress, and $L_f$ is the final length of the material after relaxation of the uniaxial stress. As physical bond, mention may, for example, be made of $\pi$ bonds, ionic bonds, Van der Waals bonds, metal-ligand coordination bonds, and hydrogen bonds.

According to one embodiment, the material comprises at least one molecule with a molecular mass ranging from 9 to 9000 g/mol, said molecule comprising at least three associative functional groups, each associative functional group comprising at least one function capable of forming two physical bonds.

According to one embodiment, the material comprises at least one molecule with a molecular mass ranging from 9 to 9000 g/mol, said molecule comprising at least three associative functional groups, each associative functional group comprising at least one function capable of forming three physical bonds.

According to one embodiment, the material comprises at least one molecule with a molecular mass ranging from 9 to 9000 g/mol, said molecule comprising at least three associative functional groups, each associative functional group comprising at least one function capable of forming four physical bonds.

According to one embodiment, the material is characterized in that $(L_d-L_0)/L_0$ is greater than or equal to 0.8.

According to one embodiment, the material is characterized in that $(L_d-L_0)/L_0$ is greater than or equal to 1.

According to one embodiment, the material is characterized in that the molecules capable of forming physical bonds are derived from triacids or from a mixture comprising diacids and triacids, these diacids or triacids containing at least 5 carbon atoms.

According to one embodiment, the material is characterized in that the molecules capable of forming physical bonds are of plant origin.

According to one embodiment, the material is characterized in that the molecules capable of forming physical bonds are molecules containing from 12 to 100 carbon atoms.

According to one embodiment, the material is characterized in that the molecules capable of forming physical bonds are molecules containing from 24 to 90 carbon atoms.

According to one embodiment, the material is characterized in that the molecules capable of forming physical bonds are dimers or trimers.

According to one embodiment, the material is characterized in that the molecules are linked via non-covalent bonds bearing associative groups of formula (1) below:

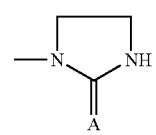

(1)

in which A denotes oxygen, sulphur or NH, and the carbon atoms on formula (1) can be substituted.

According to one embodiment, A denotes oxygen.

According to one embodiment, the material comprises (i) molecules having at least 3 associative groups, and (ii) molecules having a single associative group.

According to one embodiment, the difference between the number of associative groups belonging to the molecules which have at least three associative groups per molecule and double the total number of molecules comprising at least three associative groups is greater than 80% of the number of molecules comprising a single associative group, where "associative" means capable of associating via physical bonds.

According to one embodiment, this difference is greater than 100%, advantageously greater than 150%.

According to one embodiment, the molecular mass of the molecules constituting the material is between 17 and 5000 g/mol, advantageously it is between 500 and 1500 g/mol.

According to one embodiment, on each of the molecules having at least 3 associative groups capable of associating via non-covalent interactions, at least one of the groups has the formula below:

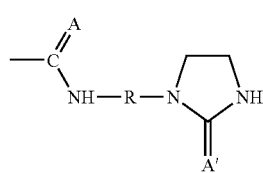

(4')

in which A and A' denote oxygen, sulphur or NH, and R denotes an organic unit with a mass of between 14 and 300.

According to one embodiment, R is chosen from the group —$CH_2$—$CH_2$— and the group —$CH_2$—$CH_2$—NH—$CH_2$—$CH_2$—.

According to one embodiment, all the associative groups of the molecules having at least 3 associative groups are of formula (4').

According to one embodiment, the molecules linked via non-covalent bonds are chosen from:

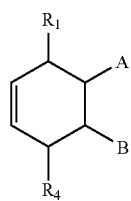

I

-continued

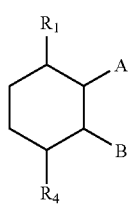
III where (A,B)=(R$_2$,R$_3$) or (R$_3$,R$_2$)
in which R$_1$ and R$_2$ are saturated or unsaturated hydrocarbon-based chains that end with a secondary amide group bearing a 2-imidazolidone ending, and R$_3$ and R$_4$ are saturated or unsaturated hydrocarbon-based chains.

According to one embodiment, the molecules linked via non-covalent bonds are chosen from:

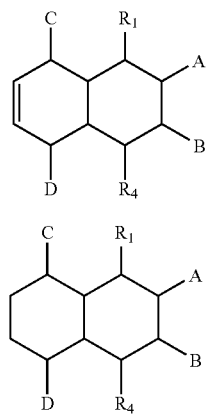

II

IV where (A,B)=(R$_2$,R$_3$) or (R$_3$,R$_2$), (C,D)=(R$_6$,R$_5$) or (R$_5$,R$_6$)
in which R$_1$, R$_2$ and R$_5$ are saturated or unsaturated hydrocarbon-based chains that end with a secondary amide group bearing a 2-imidazolidone ending, and R$_3$, R$_4$ and R$_6$ are saturated or unsaturated hydrocarbon-based chains.

According to one embodiment,

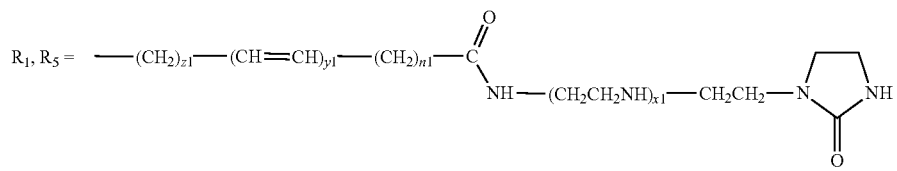

in which n$_1$=5 to 8, x$_1$=0 or 1, y$_1$=0 or 1, z$_1$=0 or 1 in which:
n$_2$=5 to 8, x$_2$=0 or 1, y$_{2=0}$ or 1, z$_2$=0 or 1, y'$_2$=0 or 1, z'$_2$=0 or 1, R$_3$, R$_4$, R$_6$=—(CH$_2$)$_{z3}$—(CH=CH)$_{x3}$—(CH$_2$)$_{n3}$—CH$_3$
where n$_3$=1 to 5, x$_3$=0 or 1, z$_3$=0 or 1.

The invention also relates to objects consisting partly or completely of the material according to any one of the preceding claims.

BRIEF DESCRIPTION OF THE INVENTION

The present invention relates to a material exhibiting the property of rubbery elasticity. Said material consists of molecules with a mass of between 9 and 9000 g/mol, all or some of the molecules having at least three groups, also referred to as "associative groups", said associative groups themselves consisting of one or more functions capable of associating via physical bonds.

Although consisting of small non-polymerized molecules that are not chemically crosslinked, this material exhibits properties of rubbery elasticity that are the exclusive position of macromolecules. According to an embodiment of the invention, this material exhibits rubbery elasticity at ambient temperature. Above a certain temperature, the material flows like a simple liquid. The material is thermoreversible, i.e. by cooling, the material again exhibits the property of rubbery elasticity. This material is self-repairing and potentially recyclable, which is never the case with a chemically crosslinked elastomer. According to the nature of the molecules constituting the material, it is possible to vary a certain number of parameters, such as the elastic properties, in particular the relaxation time at various temperatures, the creep properties, the glass transition temperature T$_g$, the temperature at which the material becomes fluid T$_f$, the solubility in various media, the chemical resistance.

The abovementioned properties of the material can also be modulated by adding adjuvants such as plasticizers, antioxidant additives, etc. The material of the invention can be dissolved in certain solvents, which is an advantage compared with the conventional crosslinked elastomers.

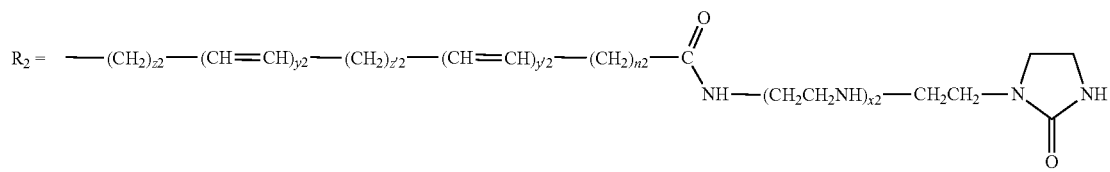

According to one form of the invention, the molecules constituting the material of the invention bear associative groups of formula (1) below:

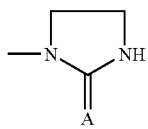

(1)

in which A denotes oxygen, sulphur or NH; the carbon atoms on formula (1) can be substituted. Preferably A denotes oxygen.

By using the group of formula (1), preferably imidazolidone, elastic materials having unique properties can be produced. While consisting of small non-polymerized molecules that are not chemically crosslinked, this material exhibits rubbery elasticity properties that are the exclusive possession of macromolecules. At high temperature (>180° C.), the material flows like a simple liquid.

The material according to the invention is capable of swelling in the presence of water or of moisture. The addition of water is also a means of varying the properties mentioned above.

The invention also relates to the objects consisting partly or completely of this material.

DETAILED DESCRIPTION OF THE INVENTION

As regards the rubbery elasticity, it can be assessed by observing the behaviour of the material during an elongation or a compression. A test piece of the material under a tensile stress is subjected to an elongation of 20% for 15 minutes at the temperature under consideration, and then, when the tensile stress has been released, the residual distortion is measured by comparison with the test piece before tensile stress. The residual distortion is less than 5%. The residual distortion is also measured after a compression of 20% for 15 minutes, the residual distortion is also less than 5%. For the purpose of the invention, the rubbery elasticity is defined by the equation $(L_f-L_0)/L_0$ less than or equal to 0.05 after distortion of the material for 15 minutes at the temperature of use, and $(L_d-L_0)/L_0$ is greater than or equal to 0.2, advantageously 0.8, preferably 1.

$L_0$: initial length of the material
$L_d$: length of the distorted material under uniaxial stress
$L_f$: final length of the material after relaxation of the stress.

As regards the molecules constituting the material, it is necessary for at least some of them to have at least three groups capable of associating via non-covalent interactions. For this, the associative groups must be correctly chosen, but the medium is also of importance. In a medium that is not very polar, if the associative groups are surrounded, for example, by hydrocarbon-based chains, the electrostatic interactions are strong; on the other hand, in a polar medium, if the associative groups are surrounded, for example, by polyoxyethylene chains, the electrostatic interactions are weakened. Preferably, the molecules should have an association constant in the medium of greater than 1000 $Lmol^{-1}$, and advantageously greater than 10 000 $Lmol^{-1}$.

It is also recommended to avoid the formation of molecular crystals. For this, those skilled in the art know that flexible or branched molecules can advantageously be used and that a mixture of similar but not identical molecules is beneficial.

The material consists, for example, (i) of molecules having at least 3 associative groups, (ii) of molecules having two associative groups, and (iii) of molecules having a single associative group. Advantageously, the difference between the number of associative groups belonging to the molecules which have at least three associative groups per molecule and double the total number of molecules comprising at least three associative groups is greater than 80% of the number of molecules comprising a single associative group (where "associative" means capable of associating via non-covalent interactions). Preferably, this difference is greater than 100%, better still greater than 150%.

Advantageously, the molecular mass of the molecules constituting the material is between 17 and 5000 g/mol, and preferably between 500 and 1500 g/mol.

Advantageously, the associative groups of the molecules constituting the material are of formula (1) as described above. Either this group is present on the molecule, or it is attached to a molecule, or alternatively it is obtained by reaction of a product of formula (2'):

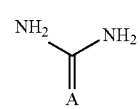

(2')

with a molecule bearing the series (2") below:

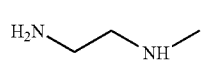

(2")

The associative groups of formula (1) can also be attached to molecules so as to obtain the molecules constituting the material of the invention. For example, it is possible to attach the product of formula (3') below:

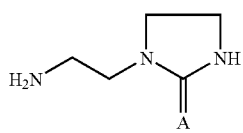

(3')

by reaction of the amine function with an epoxy or acid or anhydride function present on the molecule. The product of formula (3') can be obtained by reaction of the product of formula (2') with diethylenetriamine of formula:

When, in formula (3'), A=0, this gives 1-beta-aminoethyl-2-imidazolidone, also called 1-(2-aminoethyl)imidazolidin-2-one (CAS No. 6281-42-1), which is found in U.S. Pat. No. 2,613,212 along with the process for synthesizing it.

Preferably, on each of the molecules having at least 3 associative groups capable of associating via non-covalent interactions, at least one has the formula below:

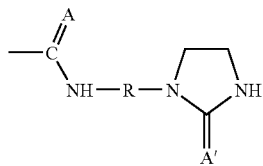
(4')

in which A and A' denote oxygen, sulphur or NH, and R denotes an organic unit with a mass of between 14 and 300 g/mol. The carbon atoms on formula (4') can be substituted. Preferably, R is chosen from the group —$CH_2$—$CH_2$— and the group —$CH_2$—$CH_2$—NH—$CH_2$—$CH_2$—.

Advantageously, all the associative groups of the molecules having at least 3 associative groups are of formula (4').

A molecule having associative groups of formula (4') in which A denotes oxygen can be obtained by reaction of a product of formula (3') with the carboxylic acid groups of a polyacid, that is optionally hydrogenated, itself obtained from fatty acids. This molecule having associative groups of formula (4') in which A denotes oxygen can also be obtained by reaction of an acid with an amine of the diethylenetriamine (DETA) or triethylenetetramine (TETA) type, and then reaction with a product of formula (2') such as urea.

By way of example of molecules constituting the material, mention may be made of the molecules below:

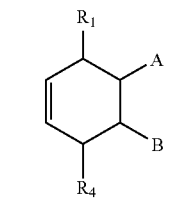
I

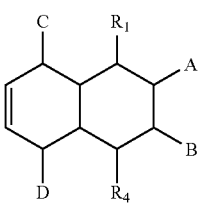
II

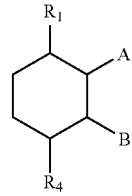
III

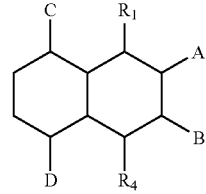
IV where $(A,B)=(R_2,R_3)$ or $(R_3,R_2)$, $(C,D)=(R_6,R_5)$ or $(R_5,R_6)$ in which $R_1$, $R_2$ and $R_5$ are saturated or unsaturated hydrocarbon-based chains that end with a secondary amide group bearing a 2-imidazolidone ending, and $R_3$, $R_4$ and $R_6$ are saturated or unsaturated hydrocarbon-based chains;

with, preferably, in formulae I to IV above:

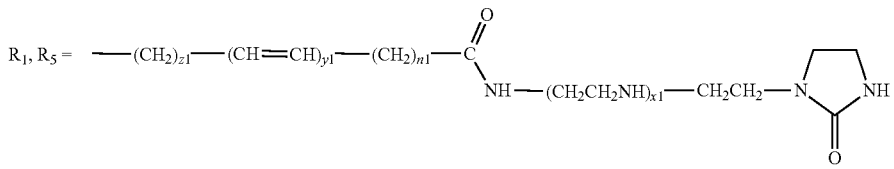

in which $n_1=5$ to 8, $x_1=0$ or 1, $y_1=0$ or 1, $z_1=0$ or 1

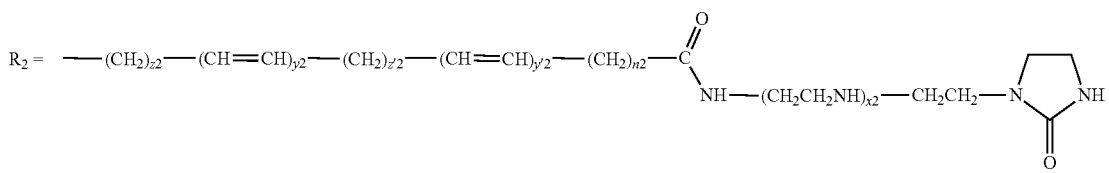

in which:

$n_2=5$ to 8, $x_2=0$ or 1, $y_2=0$ or 1, $z_2=0$ or 1, $y'_2=0$ or 1, $z'_2=0$ or 1.

$R_3, R_4, R_6 = -(CH_2)_{z3}-(CH=CH)_{x3}-(CH_2)_{n3}-CH_3$
where $n_3=1$ to 5, $x_3=0$ or 1, $z_3=0$ or 1.

The groups $R_1$ to $R_6$ may be in the axial or equatorial position.

According to a particular form, when the products obtained from dimers of nonhydrogenated fatty acids rich in linolenic acid, the major products according to formulae I and II may have the structure below (VI, VII).

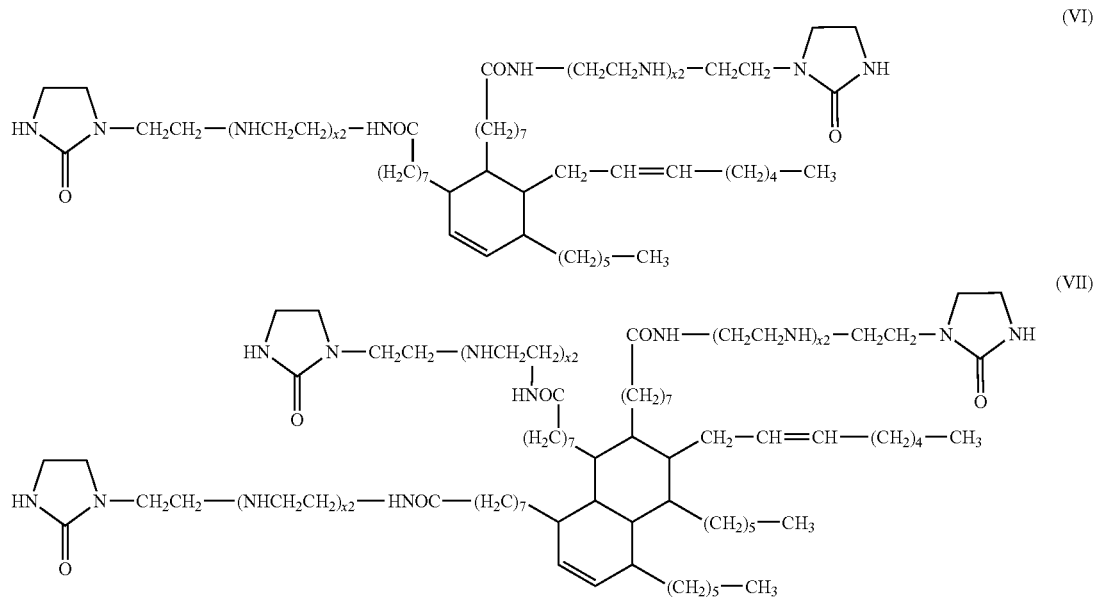

(VI)

(VII)

in which $x_2=0$ or 1.

The molecules capable of forming physical bonds can be derived from fatty acids, i.e. saturated or unsaturated carboxylic acids containing at least 5 carbon atoms, such as linear diacids, for instance glutaric acid, adipic acid, pimelic acid, suberic acid, azeleic acid or sebacic acid, or branched diacids, for instance 3,3-dimethylglutaric acid, and dimers and trimers of fatty acids of plant origin, such as lauric acid, myristic acid, palmitic acid, oleic acid, linoleic acid, stearic acid or linoleic acid, which are found in particular in pine oil, rapeseed oil, maize oil, sunflower oil, soybean oil or grapeseed oil. The term "dimers or trimers of fatty acids" is intended to mean oligomers of 1, 2 or 3 monomers, which may be identical or different. Advantageously, these saturated or unsaturated carboxylic acids contain from 12 to 100 carbon atoms, and even more advantageously between 24 and 90 carbon atoms.

The synthesis can be carried out in two steps, first by reaction of the acid dimer with an amine, which may be diethylenetriamine (DETA) ($x2=0$) or triethylenetetramine (TETA) ($x2=1$) producing a diamide (V), which, in a second step, is treated with urea so as to obtain the diimidazolidone (VI). According to the invention, the acid dimer used contains a certain proportion of acid trimer; the material obtained by this method of synthesis will also comprise a certain proportion of the molecule VII, characterized by the presence of more than two 2-imidazolidone groups. Similarly, when the acid dimer used contains a certain proportion of tetramers, pentamers or other molecules bearing more than two acid functions, the material obtained by this method of synthesis will comprise molecules characterized by the presence of more than two 2-imidazolidone groups.

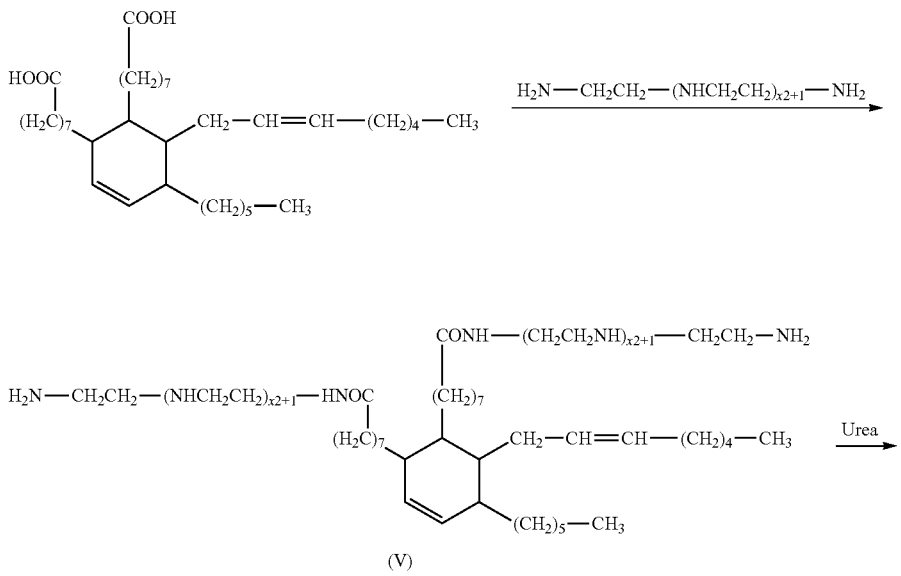

(V)

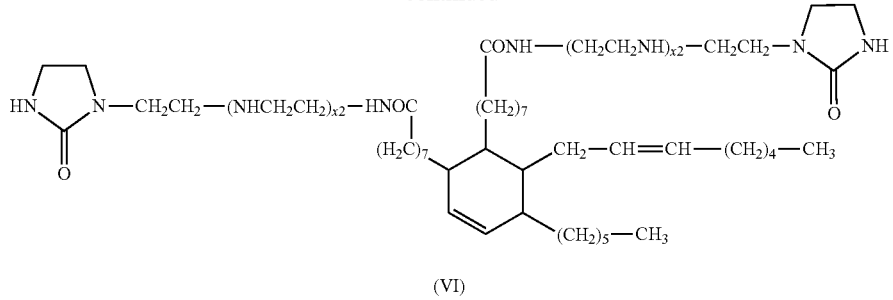

(VI)

When the products are obtained from dimers of fatty acids of natural origin, that are nonhydrogenated or partially or completely hydrogenated, this generally provides a mixture of various molecules according to formulae I to IV. This characteristic makes it possible to vary, at will, the properties of the final material, through a judicious choice of the dimer acid and of the amine used in the synthesis.

In addition to the examples of associative groups given above, mention may also be made, as an example of an associative group, of ureidopyrimidone, described in document U.S. Pat. No. 6,320,018.

As regards the temperature above which the material becomes fluid, it depends on the nature of the molecules. It is usually between 180 and 270° C. It increases with $x_1$ and increases when the polarity of the medium decreases.

As regards the breaking elongation, there is a temperature range in which it may be between 50 and 700%. This breaking elongation is measured using tensile test pieces according to ISO 527.

As regards the properties of the material, it is soluble in benzyl alcohol at 60° C.

The water uptake is 17% by mass after immersion in water for 5 days at ambient temperature.

The material swells in the presence of saturated or unsaturated hydrocarbons such as dodecane, this makes it possible to decrease the glass transition temperature. Preferably, a nonvolatile swelling agent will be chosen.

It is self-repairing, for example after an elongation as far as breaking, the faces of the material where the break occurred can be brought into contact at ambient temperature, and welding is observed. It can again be placed under a tensile stress.

Compared with the conventional thermoplastic elastomers, the materials according to the invention flow like molecular liquids at high temperature. This is an advantage in the event of a use by injection and moulding: the fluidity makes it possible, firstly, to accelerate the rates in this type of process and, secondly, to more faithfully replicate the details of the mould. The materials according to the invention are soluble in benzyl alcohol, but resistant to most solvents. The materials of the invention can contain additives, in particular water, plasticizers.

As regards the uses, mention may be made of objects that are self-repairing. The Tg and Tf of the materials can be regulated by means of the composition. The relaxation times can also be regulated by means of plasticizers.

EXAMPLES

Example 1

Synthesis UT 1008 (DA+TETA+urea)

15.00 g (0.103 mol) of TETA and 57.00 g of Empol1008® (mixture of fatty acids containing 3.5% of monoacid of mass 280±70 g/mol, 89.5% of diacid (formulae I, III) and 7% of triacid (formulae II, IV) and polyacid derived from the monoacid) are added to a 250 ml thermoregulated jacketed reactor equipped with an anchor stirrer and nitrogen sweeping. The reaction is carried out at 160° C. for 24 h. The mixture is then cooled to 130° C.

6.60 g (0.11 mol) of urea are added. After approximately 5 min, it is observed that gaseous ammonia is given off (verified with pH paper), accompanied by foaming of the reaction medium.

When the ammonia being given off decreases, the temperature is increased in 5° C. increments and so on up to 150° C. The reaction mixture becomes difficult to stir. The heating is stopped and the UT 1008 product is recovered by detaching it from the stirrer anchor. It is then placed in a vacuum oven for one week at 70° C. (vacuum of 5 mmHg) in order to evacuate the ammonia. The material obtained is pressed, at 130° C., in the form of plates that are 1 to 3 mm thick. The plates are washed by immersion in demineralized water for 2 weeks.

Example 2

Synthesis UD 1018 (DA+DETA+urea)

22.00 g (0.194 mol) of DETA and 54.40 g of Empol 1018® (mixture of fatty acids containing 4% of monoacid of mass 280±70 g/mol, 79% of diacid (formulae I, III) and 17% of triacid (formulae II, IV) and polyacid derived from the monoacid) are added to a 250 ml thermoregulated jacketed reactor equipped with an anchor stirrer and nitrogen sweeping. The reaction is carried out at 160° C. for 24 h. The mixture is then cooled to ambient temperature.

Approximately 70 ml of chloroform are added to this product, in order to solubilize the product. Demineralized water (150 ml) is then added to fill the reactor. The mixture is stirred in order to extract the excess DETA from the organic phase. After separation of the two phases, the aqueous phase is removed and the operation is repeated a second time. The chloroform is then evaporated at 70° C. under a strong stream of nitrogen.

Once the chloroform has been evaporated, the mixture is heated to 130° C. 11.65 g (0.194 mol) of urea are then added. After approximately 5 min, it is observed that gaseous ammonia is given off (verified with pH paper), accompanied by foaming of the reaction medium.

When the ammonia given off decreases, the temperature is increased in 5° C. increments and so on, up to 150° C. The reaction mixture becomes difficult to stir. The heating is stopped and the UD 1018 product is recovered by detaching it from the stirrer anchor. It is then placed in a vacuum oven for one week at 70° C. (vacuum of 5 mmHg) in order to evacuate the ammonia.

After each step, gel permeation chromatography (GPC) analyses are performed, in benzyl alcohol at 130° C., in order to verify that there is no polymerization and that the masses of the compounds remain low (Mn<1500 g·mol$^{-1}$).

FIG. 1 reports the results with heating and cooling when 2.5 g of UD 1018 are introduced into a DACA mini-extruder at 150° C. The change in load is noted as a function of the temperature.

Figure 2:
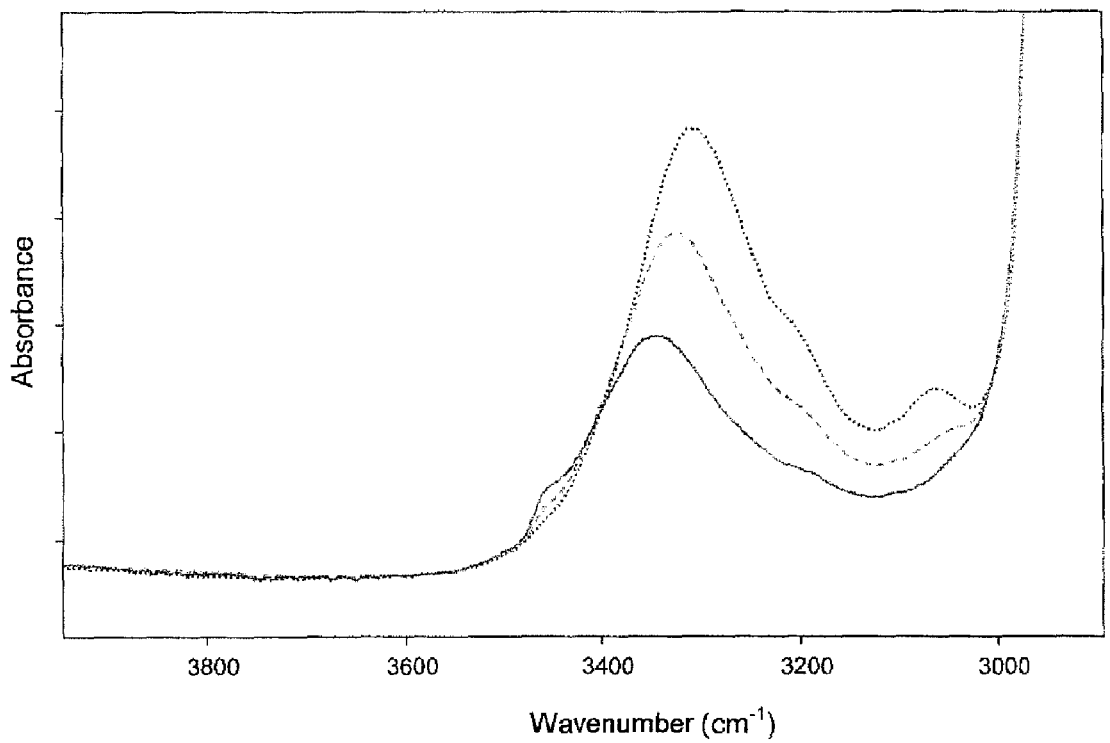

FIG. 2 is the infrared spectrum of the compound UD1018 showing the region of absorption of the free N—H linkages (3452 cm$^{-1}$) and bonded N—H linkages (3310-3340 and 3077 cm$^{-1}$) during a cooling. Continuous line T=246° C., discontinuous line T=148° C., dotted line T=65° C.

Figure 3A:
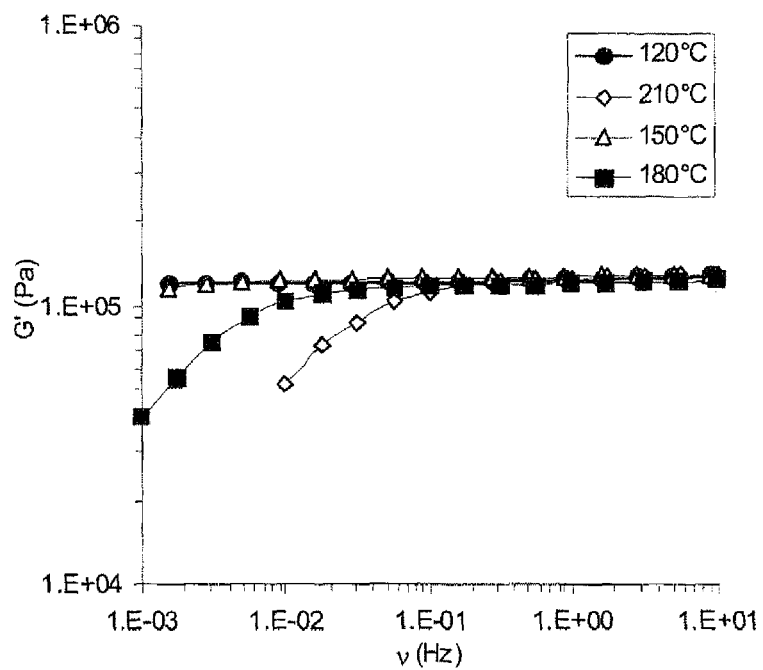
Figure 3B:
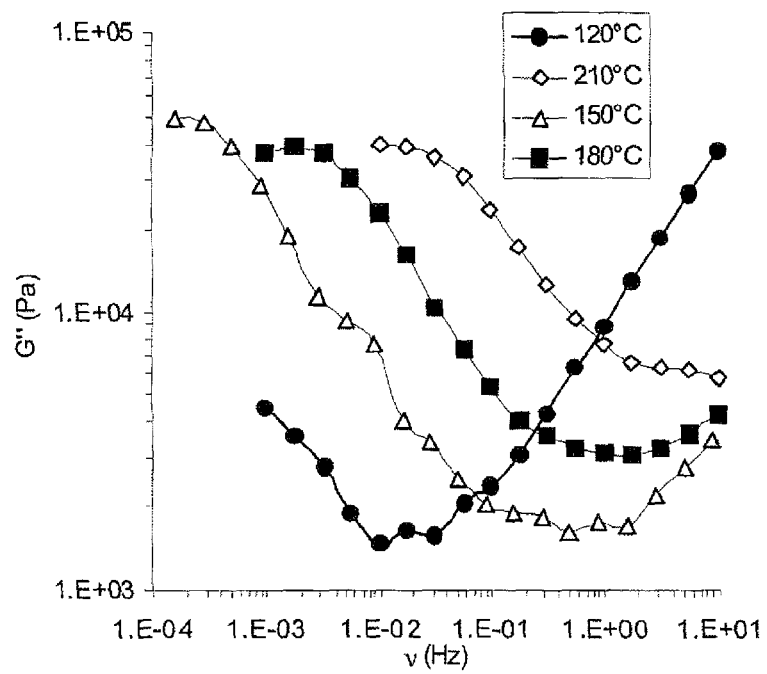

FIGS. 3a and b represent the isotherms of the storage modulus, G'(v) FIG. 3a, and of the loss modulus, G"(v) FIG. 3b, of the compound UT1008 as a function of the frequency of solicitation.

Figure 4A:
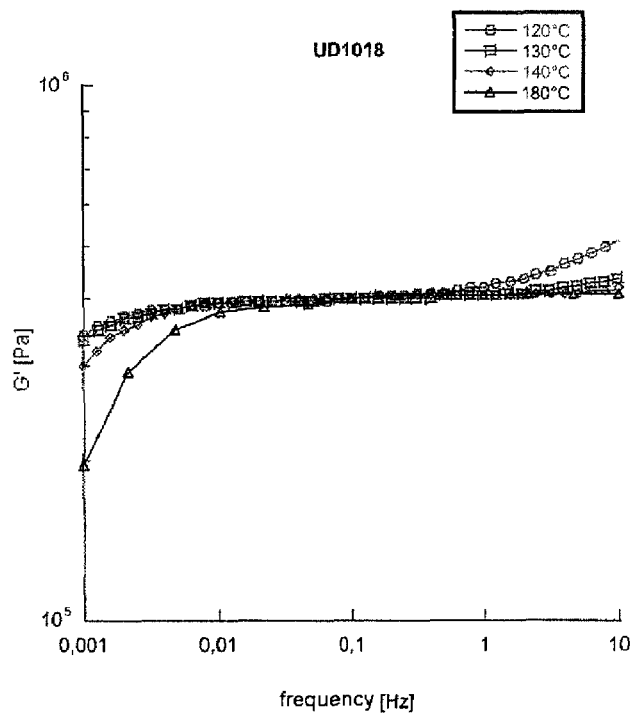
Figure 4B:
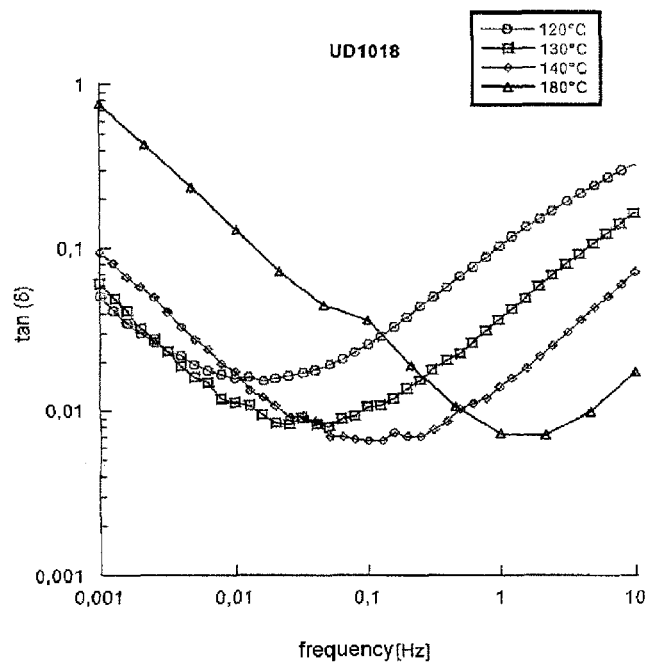

FIGS. 4a and b represent the isotherms of the storage modulus, G'(v) FIG. 4a, and of the loss factor, tan($\square$)=G"(v)/G'(v) FIG. 4b, of the compound UD1018 as a function of the frequency of solicitation. FIG. 4a curves normalized to 0.1 Hz so as to take into account various sample geometries.

Figure 5A:
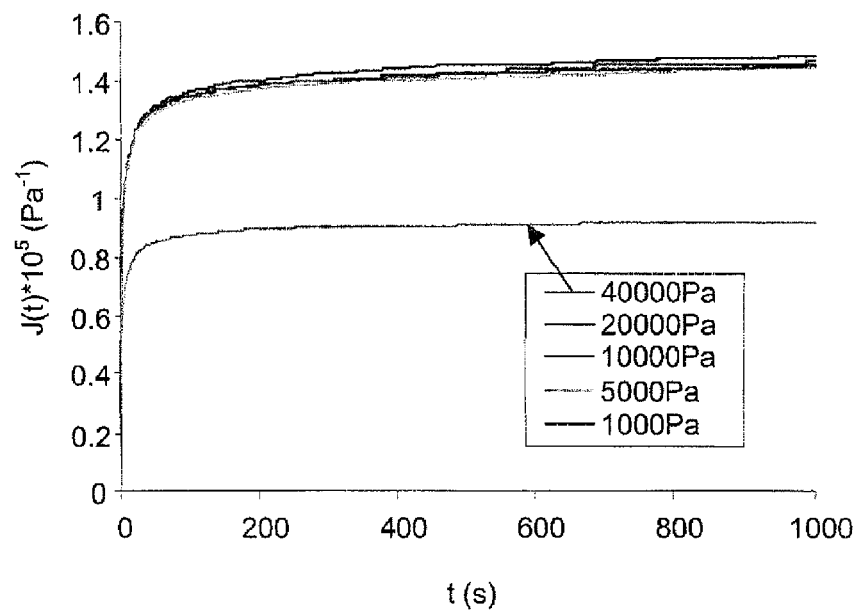
Figure 5B:
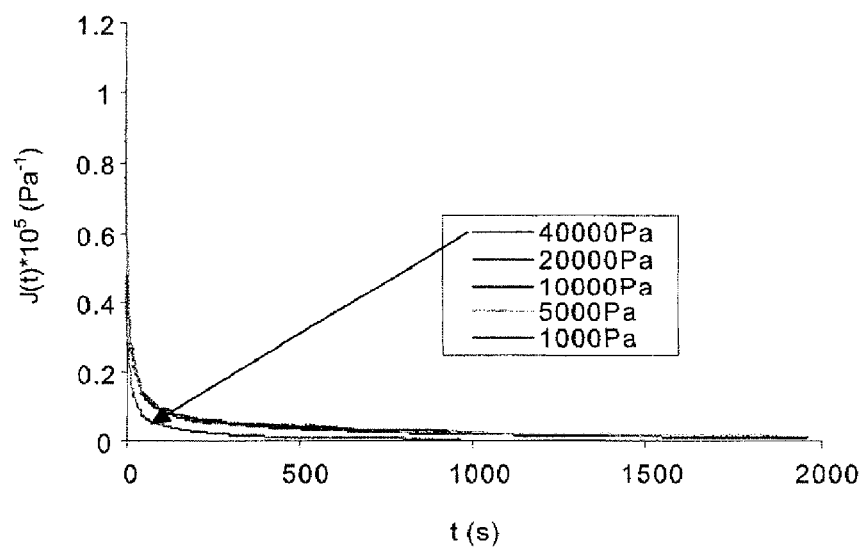

FIGS. 5a and b represent the creep FIG. 5a and recovery FIG. 5b tests. Stresses of increasing intensity ($\sigma$) are applied to the sample for 1000 s and then relaxed. The mechanical admittance (compliance) J=distortion/stress is represented as a function of time. The distortions are 1.47%, 7.43%, 15.1%, 30.7% and 36.5%, respectively.

Figure 6:
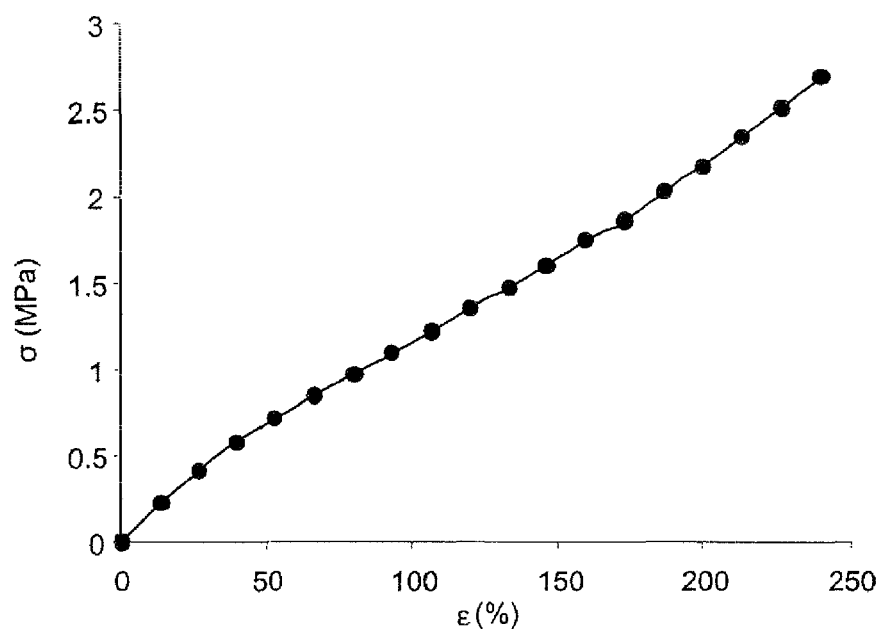

FIG. 6 represents an experiment of uniaxial tensile stress at 90° C. of the compound UT1008 until breaking. The stress sigma is represented as a function of the distortion, epsilon $\square$ where epsilon=(l–I$_0$)/I$_0$. The elongation rate is 100%.min$^{-1}$. The final distortion is 240%. The compound UD1018 gives similar results.

Figure 7A:
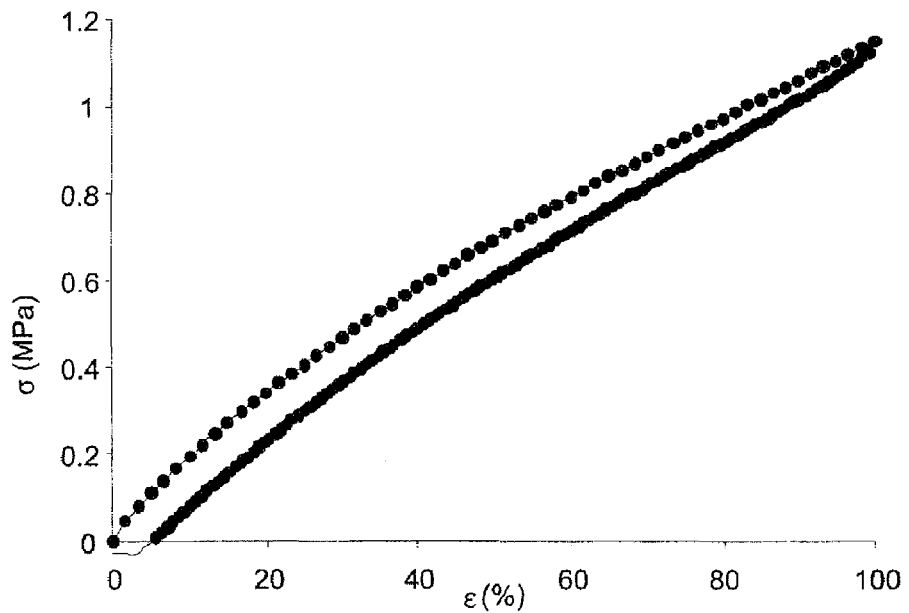
Figure 7B:
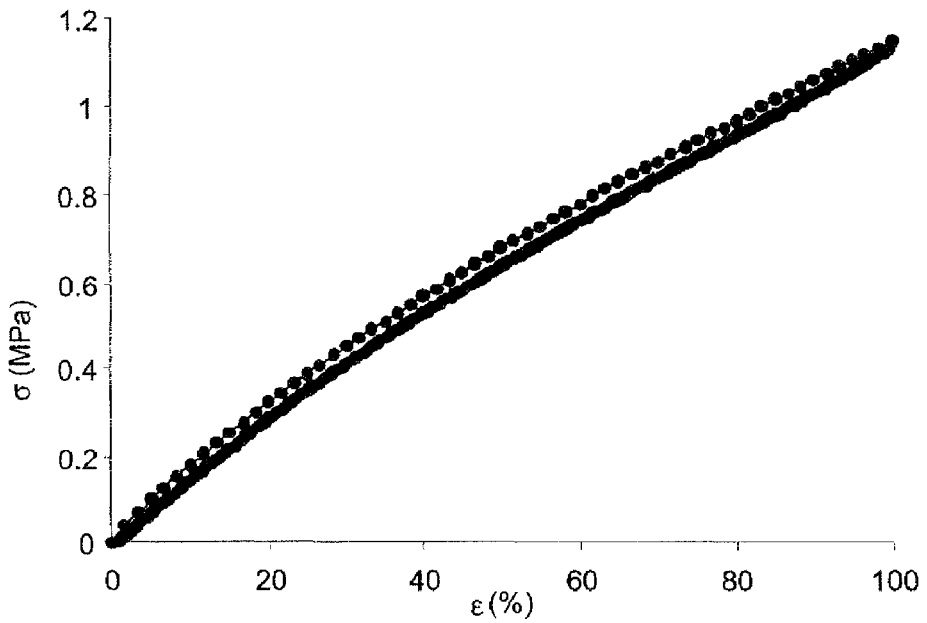

FIGS. 7a and b represent the stress sigma in the course of the tensile stress cycles (elongation and return without breaking) of the compound UT1008 at 90° C. The maximum distortion is 100%. The distortion rate is 100%.min$^{-1}$ with elongation, and –40%.min$^{-1}$ for the return. An irreversible distortion of 5% is noted after the first cycle FIG. 7a; no irreversible distortion is noted at the second cycle FIG. 7b.

Figure 8:
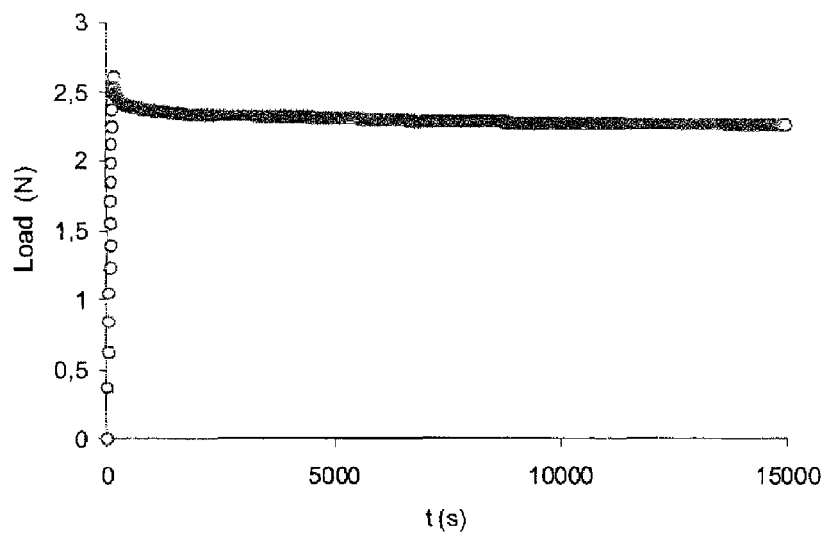

FIG. 8 represents creep experiments for UT1008. The distortion is 100% and is maintained for 24 hours. The distortion rates are 50%.min$^{-1}$ and the temperature is 70° C.

Figure 9:
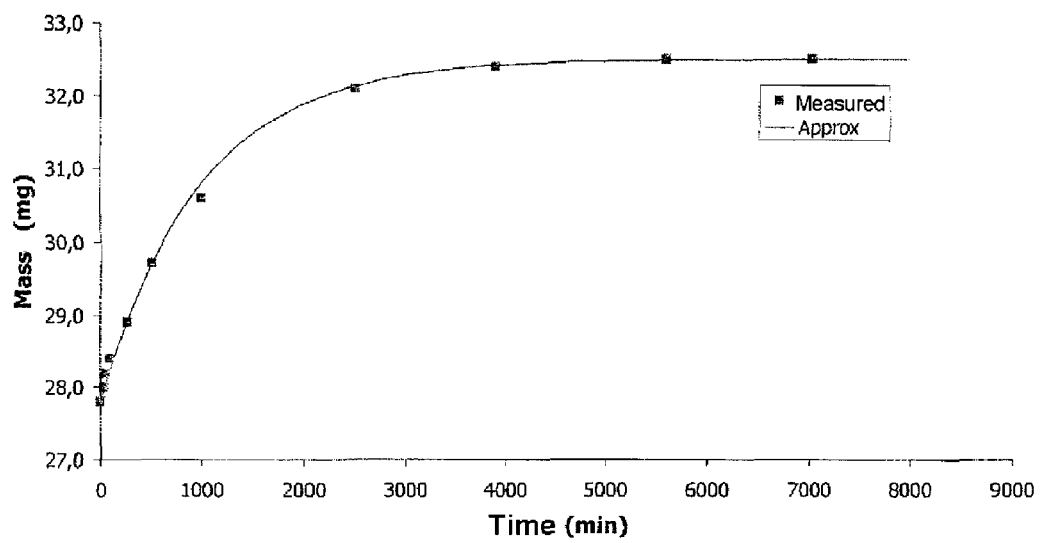

FIG. 9 represents swelling experiments for UT1008B with water at ambient temperature.

Swelling

Two dumbbell-shaped tensile-stress test pieces (inter-dumbbell distance of 25 mm) were placed in the presence of dodecane for 96 hours at ambient temperature so as to swell the samples with approximately 10% of dodecane (test piece 1) and approximately 15% of dodecane (test piece 2).

After 96 hours, the samples were surface-dried with paper and then weighed in order to measure the swelling. The effective swellings measured by weighing were:

test piece 1: 8.6% test piece 2: 12.8%

Before performing the mechanical tests, the samples were maintained at 60° C. for 12 hours in a closed container.

Tensile-Stress Trials

Test Piece 1: 8.6% of Dodecane

Cycle 1. Elongation to 100% (rate 100%/min) then return to 0% (rate 40%/min). The recovery loss is 5.9% after 200 min.

Cycle 2. Elongation to 100% (rate 100%/min) then return to 0% (rate 40%/min). The recovery loss is 0.3% after 70 min.

Cycle 3. Elongation to 400% (rate 40%/min). The recovery loss is 7.6% after 60 min.

Cycle 4. Elongation to breaking (rate 40%/min). Breaking at 570%. After breaking, the two ends of the test piece are brought into contact. It is kept vertically. The recovery loss is 1.1% after 24 hours.

Cycle 5. Elongation to breaking (rate 40%/min). Breaking at 300%. After breaking, the two ends of the test piece are brought into contact. It is maintained vertically. The recovery loss is 0.1% after 36 hours.

Cycle 6. Elongation to breaking (rate 40%/min). Breaking at 220%.

Figure 10:
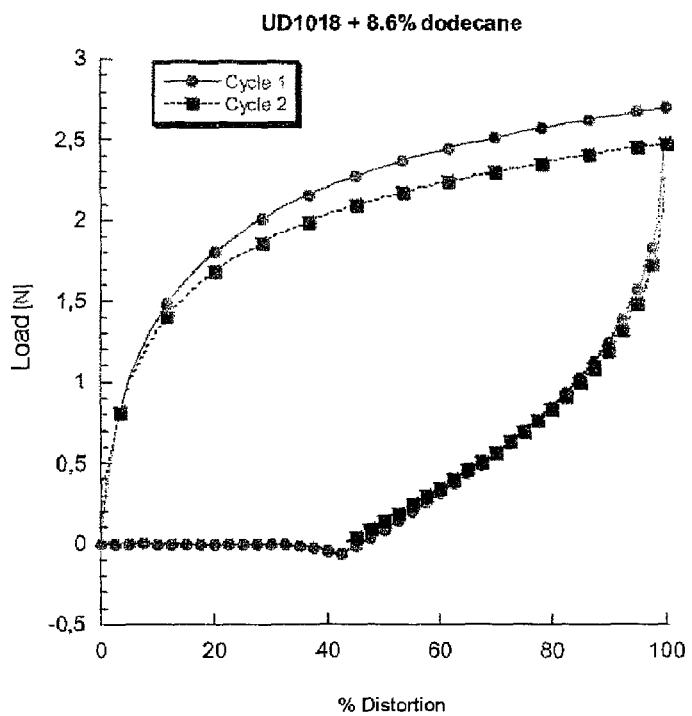
Figure 10:
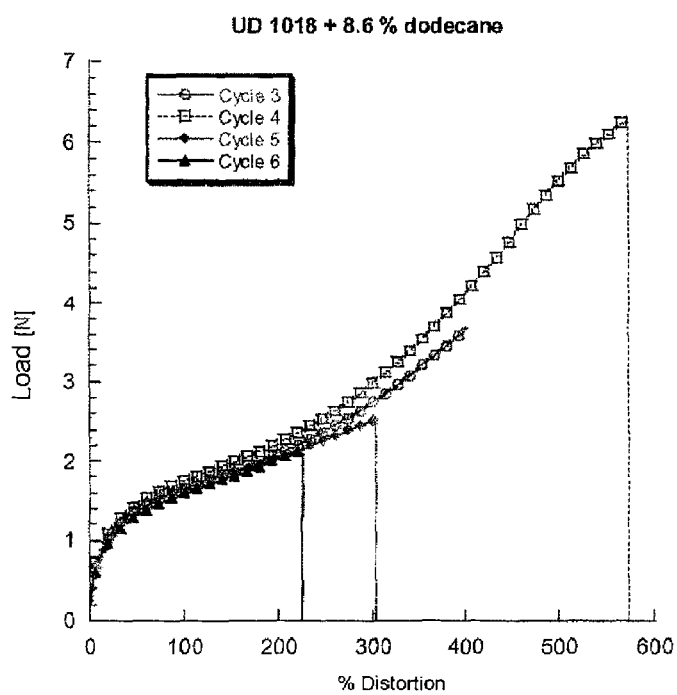

FIG. 10 represents the above trials of uniaxial tensile stress at 25° C. for the compound UD1018 to which 8.6% of dodecane has been added, a) before breaking (cycles 1-3), b) up to breaking (cycle 4), c) after successive breaking and reattachment (cycles 5, 6). The constraint is represented as a function of the distortion defined above. The elongation rate is +100%.min$^{-1}$ (cycles 1, 2), +40% min$^{-1}$ (cycles 3-6). The distortion at breaking is 570%.

Test Piece 2: 12.8% of Dodecane

Cycle 1. Elongation to 100% (rate 40%/min) then return to 0% (rate 20%/min). The recovery loss is 3% after 60 min.

Cycle 2. Elongation to 100% (rate 40%/min) then return to 0% (rate 20%/min). The recovery loss is 0.3% after 60 min.

Cycle 3. Elongation to 100% (rate 40%/min) then return to 0% (rate 20%/min). The recovery loss is 0.3% after 60 min.

Cycle 4. Elongation to breaking (rate 40%/min). Breaking at 635%.

Cycle 5. After breaking, the two ends of the test piece are brought into contact. It is maintained vertically. The recovery loss is 10% after 36 hours.

Cycle 6 Elongation to breaking (rate 40%/min). Breaking at 240%.

Figure 11:
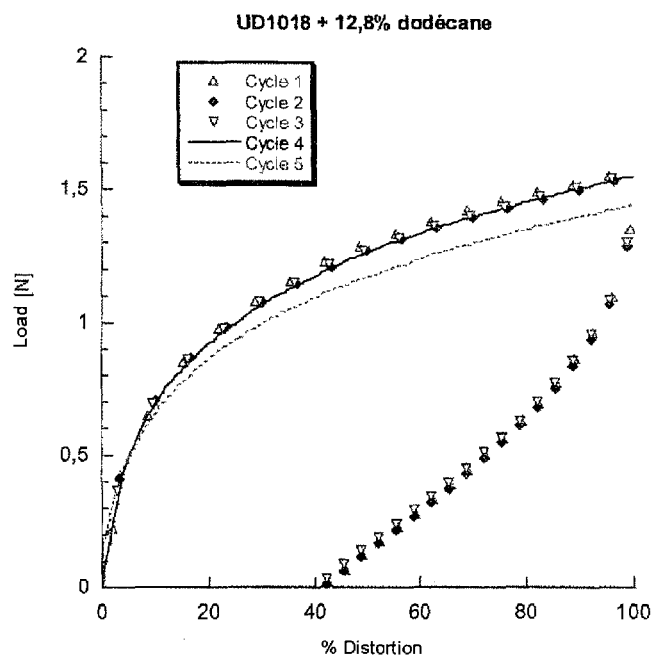
Figure 11:
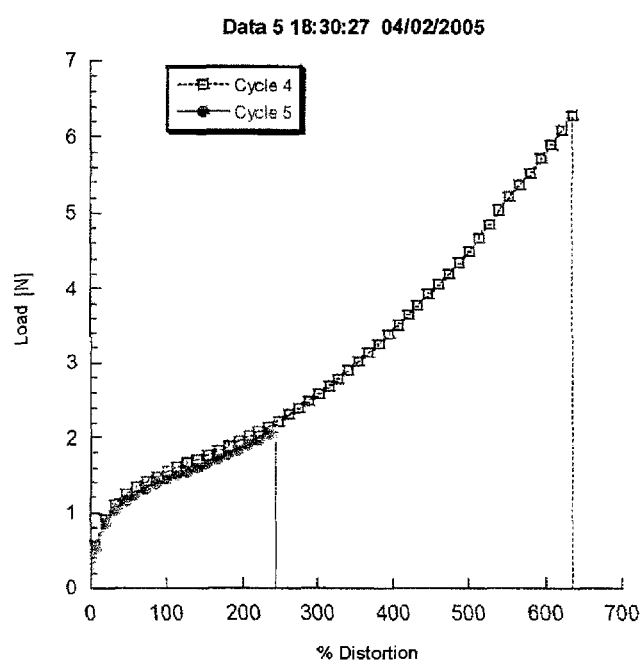

FIG. 11 represent the above trials of uniaxial tensile stress at 25° C. for the compound UD1018 to which 12.8% of dodecane has been added, a) before breaking (cycles 1-3), b) up to breaking (cycle 4), c) after breaking and reattachment (cycle 5). The constraint is represented as a function of the distortion defined above. The elongation rate is +40% min$^{-1}$. The distortion at breaking is 635%.

Figure 12:
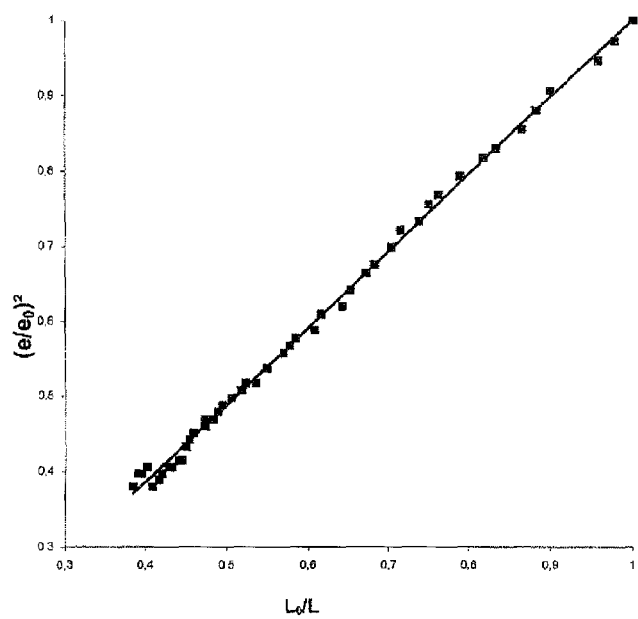

FIG. 12 represents the change in dimensions of a rectangular region of dimensions $L_0 \times e_0$ pinpointed on a face of the test piece during a uniaxial tensile-stress trial. $L/L_0$ is the distortion along the axis of tensile stress, $e/e_0$ is the distortion in the direction perpendicular to the axis of tensile stress. By means of the criterion $(L_0/L)/(e/e_0)^2=1$, it is verified that the distortion involved is a constant-volume distortion.

The invention claimed is:

1. A material comprising molecules, each of said molecules with a molecular mass of 9000 g/mol or less, some of said molecules comprising at least three associative functional groups, each associative functional group having formula (1):

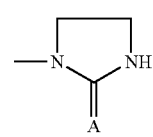

(1)

in which A denotes oxygen, sulphur, or NH, and the carbon atoms on formula (1) can be substituted, each associative functional group being capable of forming at least one non-covalent bond, wherein said molecules comprising at least three associative functional groups are present in the material in an amount effective to cause said material to have a rubbery elasticity as measured at 25° C., said rubbery elasticity being defined by the fact that, after a distortion under uniaxial stress for 15 minutes of said material from an initial length $L_0$ to a length $L_d$ such that $(L_d-L_0)/L_0$ is greater than or equal to 0.2, the material returns, after relaxation of the uniaxial stress, to a length $L_f$ such that $(L_f-L_0)/L_0$ is less than or equal to 0.05, given that $L_0$ is the initial length of the material, $L_d$ is length of the distorted material under uniaxial stress, and $L_f$ is the final length of the material after relaxation of the uniaxial stress, wherein, in addition to said molecules comprising at least three associative functional groups, said material further comprises molecules having the formula:

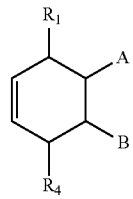

where $(A,B)=(R_2,R_3)$ or $(R_3,R_2)$, in which $R_2$ is a hydrocarbon-containing chain that ends with a secondary amine group bearing a 2-imidazolidone ending, and $R_3$ and $R_4$ are saturated or unsaturated hydrocarbon-containing chains, and wherein $R_1$ is

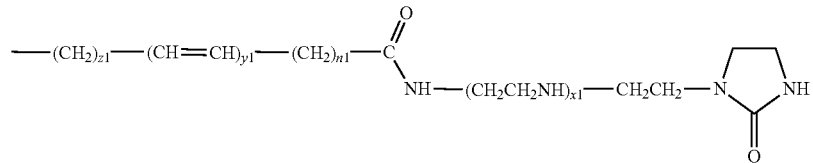

in which:

$n_1$=5 to 8, $x_1$=0 or 1, $y_1$=0 or 1, $z_1$=0 or 1, said material further comprising molecules having a single associative functional group having formula (1).

2. The material according to claim 1, characterized in that the molecules comprising at least three associative functional groups are derived from triacids or from a mixture comprising diacids and triacids, these diacids or triacids containing at least 5 carbon atoms.

3. The material according to claim 1, characterized in that the molecules comprising at least three associative functional groups contain from 24 to 90 carbon atoms.

4. The material according to claim 1, characterized in that the molecules comprising at least three associative functional groups are dimers or trimers.

5. The material according to claim 1, wherein, on each of the molecules comprising at least three associative functional groups, each of the at least three associative functional groups has formula (1), in which A denotes oxygen.

6. The material according to claim 1, wherein, on each of the molecules comprising at least three associative functional groups, each of said associative functional groups comprises a 2-imidazolidone group.

7. The material according to claim 1, in which the difference between the number of associative functional groups belonging to the molecules which have at least three associative functional groups per molecule and double the total number of molecules comprising at least three associative functional groups is greater than 80% of the number of molecules comprising a single associative functional group.

8. The material according to claim 7, in which said difference is greater than 100%.

9. The material according to claim 8, in which said difference is greater than 150%.

10. The material according claim 1, in which the molecular mass of said molecules with a molecular mass of 9000 g/mol or less is between 500 and 1500 g/mol.

11. The material according to claim 1, wherein, on each of the molecules comprising at least three associative functional groups, at least one of the associative functional groups has formula (4'):

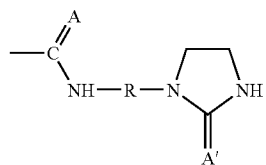

in which A and A' denote oxygen, sulphur or NH, and R denotes an organic unit with a mass of between 14 and 300 g/mol.

12. The material according to claim 11, in which R is chosen from the group —$CH_2$—$CH_2$— or the group —$CH_2$—$CH_2$—NH—$CH_2$—$CH_2$—.

13. The material according to claim 11, in which all the associative functional groups of the molecules having at least three associative groups are of formula (4').

14. The material according to claim 1, in which:

$$R_3, R_4 = -(CH_2)_{z3}-(CH=CH)_{x3}-(CH_2)_{n3}-CH_3$$

where $n_3$=1 to 5, $x_3$=0 or 1, $z_3$=0 or 1.

15. An object comprising the material according to claim 1, the object selected from the group consisting of leaktight joints, thermal insulating materials, sound-proofing materials, tyres, cables, sheaths, soles of shoes, packagings, coatings, paints, cosmetic products, films, elastic clamping collars, vacuum tubes, transport tubes, flexible hoses, rheological additives, fluids, adhesives, and hot-melt adhesives.

16. The material according to claim 1, wherein, in addition to said molecules with a molecular mass of 9000 g/mol or less, the material further comprises at least one additional additive.

17. The material according to claim 16, wherein said at least one additional additive is selected from the group consisting of at least one plasticizer, at least one stabilizer, at least one polymer, and combinations thereof.

* * * * *